Jan. 30, 1923. 1,443,340
T. R. BLOMBERG.
ROLLER CAGE FOR ROLLER BEARINGS
FILED DEC. 23, 1920.
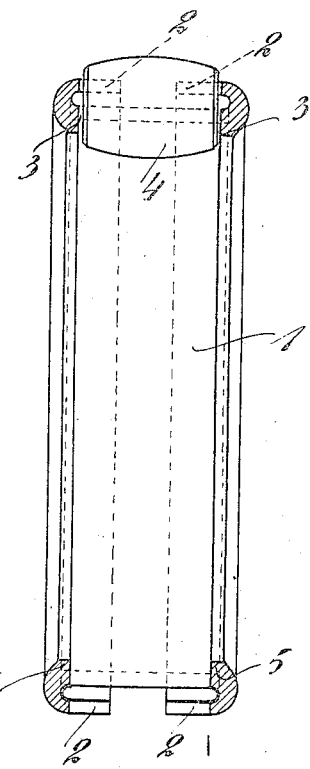
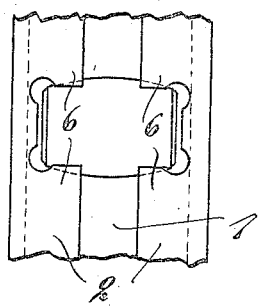
INVENTOR
TAGE RAGNAR BLOMBERG,
by Richards & Geier.
Attorneys.

Patented Jan. 30, 1923.

1,443,340

UNITED STATES PATENT OFFICE.

TAGE RAGNAR BLOMBERG, OF HUVUDSTA, SWEDEN.

ROLLER CAGE FOR ROLLER BEARINGS.

Application filed December 23, 1920. Serial No. 432,776.

*To all whom it may concern:*

Be it known that I, TAGE RAGNAR BLOMBERG, a subject of the King of Sweden, and resident of Huvudsta, in the Kingdom of Sweden, have invented certain new and useful Improvements in Roller Cages for Roller Bearings (for which I have filed an application in Sweden No. 3,576/1918, filed Sept. 18, 1918, but which has not been published), of which the following is a specification, reference being had therein to the accompanying drawing.

The present invention relates to a roller-cage for roller-bearings, which roller-cage comprises a ring, the edges of which are deflected so that they are directed inwards towards each other on the outside of the ring, and in which ring openings for the rollers are provided. The invention consists in this that the opening in the ring is of such a form that a pair of laps directed one towards the other are formed, which after having been bent radially inwards form with their sides an end support and a guide for the rollers, the deflected edges located on the outside of the ring being formed to a pair of laps entering between the rollers and resting against the periphery of the rollers.

In the accompanying drawing Fig. 1 is a cross-section of a roller-cage according to my invention. Fig. 2 shows a part of the roller-cage seen from the outside, and Fig. 3 shows a detail.

The roller-cage comprises a ring 1 the edges 2 of which are deflected, so that they are directed inwards towards each other on the outside of the ring. In this ring holes or openings 3 for the rollers 4 are stamped. These openings are given such a form that in the ring 1, at the ends of the opening 3, two short laps 5 directed one towards the other are formed, which are then bent radially inwards, as shown in Fig. 1, so that they form an end support and a guide for the rollers 4. In the deflected edges lying outside the ring laps 6 are also stamped, which enter between the rollers and rest against the periphery of the same. On account of their form the laps 6 spring so much that they allow the pressing of the roller into the recess 3. When the rotating part is in repose the ring with the laps 6 is suspended from the rollers, so that the ring keeps its position in the bearing.

Having now described my invention, what I claim as new and desire to secure by Letters Patent is:

Roller-cage for roller-bearings, which cage comprises a ring, the edges of which are deflected so that they are directed inwards towards each other on the outside of the ring, and in which ring openings for the rollers are provided, characterized by the fact that the opening in the ring is of such a form, that a pair of laps directed one towards the other are formed, which after having been bent radially inwards form with their sides an end support and a guide for the rollers, the deflected edges located on the outside of the ring being formed to a pair of laps entering between the rollers and resting against the periphery of the rollers.

In witness whereof, I have hereunto signed my name.

TAGE RAGNAR BLOMBERG.